(12) United States Patent
Vaello Paños et al.

(10) Patent No.: US 11,870,952 B2
(45) Date of Patent: Jan. 9, 2024

(54) PRESENCE DETECTION IN TIME OF FLIGHT SENSING SYSTEMS

(71) Applicant: ams International AG, Jona (CH)

(72) Inventors: Miguel Bruno Vaello Paños, Zurich (CH); David Stoppa, Eindhoven (NL)

(73) Assignee: AMS INTERNATIONAL AG, Rapperswil (CH)

( * ) Notice: Subject to any disclaimer, the term of this patent is extended or adjusted under 35 U.S.C. 154(b) by 285 days.

(21) Appl. No.: 17/299,119

(22) PCT Filed: Dec. 3, 2019

(86) PCT No.: PCT/EP2019/083417
§ 371 (c)(1),
(2) Date: Jun. 2, 2021

(87) PCT Pub. No.: WO2020/115015
PCT Pub. Date: Jun. 11, 2020

(65) Prior Publication Data
US 2022/0053155 A1    Feb. 17, 2022

Related U.S. Application Data

(60) Provisional application No. 62/862,881, filed on Jun. 18, 2019, provisional application No. 62/774,614, filed on Dec. 3, 2018.

(51) Int. Cl.
*H04N 25/705* (2023.01)
*G01S 17/894* (2020.01)
(Continued)

(52) U.S. Cl.
CPC ......... *H04N 25/705* (2023.01); *G01S 7/4816* (2013.01); *G01S 17/894* (2020.01); *G06F 18/232* (2023.01); *H04N 25/709* (2023.01)

(58) Field of Classification Search
CPC .. H04N 25/705; H04N 25/709; G01S 17/894; G01S 7/4816; G06F 18/232
(Continued)

(56) References Cited

U.S. PATENT DOCUMENTS

| 11,562,582 B2 * | 1/2023 | Vaello Paños ....... H04N 13/254 |
| 2012/0219183 A1 * | 8/2012 | Mori ......................... G06T 7/20 |
| | | 382/103 |

(Continued)

FOREIGN PATENT DOCUMENTS

CN           107924464 A        4/2018

OTHER PUBLICATIONS

International Search Report for Application No. PCT/EP2019/083417 dated Feb. 14, 2020.
(Continued)

*Primary Examiner* — James E Springer
(74) *Attorney, Agent, or Firm* — TAROLLI, SUNDHEIM, COVELL & TUMMINO L.L.P.

(57) ABSTRACT

A method for operating a 3D sensor system includes by an array of pixels of an imaging sensor of the 3D sensor system, generating first image data representative of reflected light from an environment, the image data having a first resolution. The method includes by processing circuitry of the 3D sensor system, generating second image data based on the first image data, the second image data having a second resolution less than the first resolution; and by the processing circuitry of the imaging sensor, determining that the second image data indicates that an object is present in the environment. The method includes responsive to the determining, providing the first image data from the 3D sensor system to one or more processors configured to generate a three-dimensional image of the environment based on the first image data.

18 Claims, 12 Drawing Sheets

(51) Int. Cl.
*G01S 7/481* (2006.01)
*G06F 18/232* (2023.01)
*H04N 25/709* (2023.01)

(58) Field of Classification Search
USPC .......................................................... 348/135
See application file for complete search history.

(56) References Cited

U.S. PATENT DOCUMENTS

2016/0150219 A1   5/2016   Gordon et al.
2017/0064211 A1   3/2017   Omid-Zohoor
2018/0285673 A1   10/2018  Arnold et al.

OTHER PUBLICATIONS

CN Office Action for corresponding CN Application No. 201980080105, dated Sep. 25, 2023, pp. 1-9.
CN Office Action for corresponding CN Application No. 201980080105, with English translation, dated Sep. 25, 2023, pp. 1-9.

* cited by examiner

PRESENCE DETECTION IN TIME OF FLIGHT SENSING SYSTEMS

RELATED APPLICATIONS

The present invention is a U.S. National Stage under 35 USC 371 patent application, claiming priority to Serial No. PCT/EP2019/083417, filed on 3 Dec. 2019; which claims priority of U.S. Provisional Application Ser. No. 62/774614, filed on 3 Dec. 2018; and U.S. Provisional Application Ser. No. 62/862881, filed on 18 Jun. 2019, the entirety of which are incorporated herein by reference.

TECHNICAL FIELD

This disclosure relates to time-of-flight systems and more particularly to presence detection in time-of-flight systems.

BACKGROUND

Three-dimensional (3D) images enable a depth representation of a scene to be captured. 3D sensing systems, such as time-of-flight (ToF) systems, employ an illumination source, e.g., in the infrared, and a sensor. The illumination source of a 3D sensing system can be a modulated illumination source with dedicated pixels, such as lock-in pixels or single photon avalanche diodes. The modulation frequency or pulse length for the illumination can depend on factors such as the distance range and the desired precision of the resulting image, and can range as high as several hundred megahertz (for the modulation frequency) or as short as several picoseconds (for the pulse length).

SUMMARY

In an aspect, a method for operating a 3D sensor system includes by an array of pixels of an imaging sensor of the 3D sensor system, generating first image data representative of reflected light from an environment, the image data having a first resolution. The method includes by processing circuitry of the 3D sensor system, generating second image data based on the first image data, the second image data having a second resolution less than the first resolution; and by the processing circuitry of the imaging sensor, determining that the second image data indicates that an object is present in the environment. The method includes responsive to the determining, providing the first image data from the 3D sensor system to one or more processors configured to generate a three-dimensional image of the environment based on the first image data.

Embodiments can include one or more of the following features.

The determining by the processing circuitry of the imaging sensor uses less power than the generation of the three-dimensional image by the one or more processors.

Determining that the second image data indicates that the object is present in the environment includes determining a distance from the 3D sensor system to the object and comparing the distance to a threshold. The method includes when the distance does not satisfy the threshold, causing the a mobile device housing the 3D sensor system to enter a sleep mode.

Generating second image data based on the first image data includes down sampling the first image data.

Generating the second image data includes grouping pixels in the array of pixels into at least one cluster of pixels; and generating cluster data for each of the at least one cluster of pixels, and wherein the second image data includes the cluster data. Determining that the second image data indicates that an object is present in the environment includes performing single point detection using the cluster data from a single one of the clusters of pixels. Determining that the second image data indicates that an object is present in the environment includes performing multipoint detection using the cluster data from multiple clusters of pixels. Performing multipoint detection includes performing non-uniform multipoint detection.

The method includes estimating a signal to noise ratio of the second image data based on an intensity of the second image data; and regulating an exposure time of the array of pixels to the reflected light based on the estimated signal to noise ratio.

The method includes regulating a power of an illumination device configured to illuminate the environment based on an intensity of the second image data.

Determining that the second image data indicates that an object is present in the environment includes identifying a region in which the object is positioned; and including providing information indicative of the identified region to the one or more processors.

In an aspect, a 3D sensor system includes an integrated circuit including an imaging sensor including an array of pixels formed in a semiconductor substrate, the array of pixels configured to generate first image data representative of reflected light from an environment, the first image data having a first resolution; processing circuitry formed in the semiconductor substrate, the processing circuitry configured to: generate second image data based on the first image data, the second image data having a second resolution less than the first resolution; and determine that the second image data indicates that an object is present in the environment; and output circuitry configured to provide the first image data from the 3D sensor system to one or more processors configured to generate a three-dimensional image of the environment based on the first image data.

Embodiments can include one or more of the following features.

The determining by the processing circuitry uses less power than the production of the three-dimensional image by the one or more processors.

The processing circuitry is configured to determine a distance from the 3D sensor system to the object and compare the distance to a threshold, based on the second image data.

The processing circuitry is configured to cause a mobile computing device housing the 3D sensor system to enter a sleep mode when the distance does not satisfy the threshold.

The processing circuitry is configured to down sample the first image data to generate the second image data.

The processing circuitry is configured to group pixels in the array of pixels into at least one cluster of pixels, wherein each of the clusters includes at least one pixel; and generate cluster data for each of the at least one cluster of pixels, wherein the second image data includes the cluster data.

The approaches described here can have one or more of the following advantages. The systems and methods described here provide approaches to presence detection that consume a relatively low amount of power and that are simple to implement, occupy only a small amount of processing area, and can be fabricated for relatively low cost. These systems and methods can enhance power conservation, e.g., increase the amount of time the system can operate before having to charge or replace a battery or connect to a power source.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Active 3D systems allow a depth representation of a scene to be captured, for example, by means of structured light, stereo vision, or time-of-flight techniques. Such systems may be used to capture representations of objects (e.g. a human face) in front of a device in order to, for example, unlock the device, track facial gestures, or enable a security operation. The time-of-flight based 3D sensor systems disclosed here can operate with low-resolution, low-power performance for detecting the presence of an object in front of the device. When an object is determined to be present, the same system can operate with high-resolution, high-performance performance, e.g., for generation of a depth representation of the object, such as a 3D image of the object. Specifically, the low-power presence detection can be achieved by compressing and processing image data using processing circuitry integrated with an imaging sensor of the 3D sensor system. When an object is determined to be present, high-resolution image data can be provided to external processors for generation of a high resolution depth representation of the object.

Figure 1:
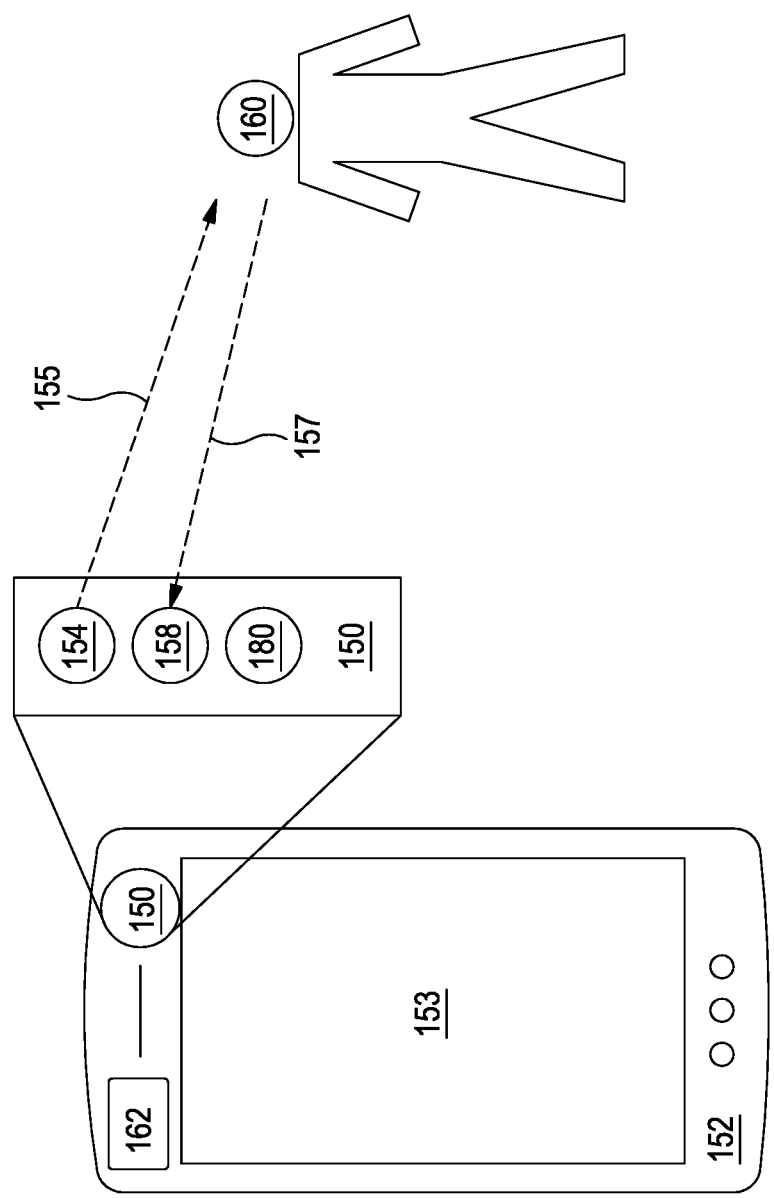
FIG. 1 is a view of a 3D sensor system integrated with a mobile computing device.

Referring to FIG. 1, in some examples, a 3D sensor system 150 employing time of flight sensors such as those described here can be mounted on or incorporated into a front side of a mobile computing device 152, such as a mobile phone, a tablet, or a wearable computing device. The front side of the mobile device 152 is the side of the device that includes a screen 153. The 3D sensor system 150 can be a front-side sensor system that includes an illumination device 154 and imaging components including a ToF imaging sensor 158. The front side 3D sensor system 150 can be used for 3D imaging applications, e.g., for facial recognition. For instance, the front side 3D sensor system 150 can be used to generate an image of a user's face 160, e.g., for facial recognition processing, e.g., by one or more processors 162 of the mobile computing device 152, such as application specific integrated circuits (ASICs). The 3D sensor system 150 includes processing circuitry 180 that has the capability for compression and low resolution processing of the image data, e.g., for detection of the presence of an object in the field of view of the 3D sensor system 150. The processing circuitry 180 can be integrated with circuitry of the sensor system 150, e.g., with circuitry of the imaging sensor 158. For instance, the processing circuitry 180 can be formed on the same integrated circuit chip as the sensor system, can be used to carry out the compression and presence detection processing. The 3D sensor system 150 is also connected to the one or more processors 162 of the mobile device for high resolution processing of the image data, e.g., for generation of a 3D representation of the user's face 160.

The environment of the 3D sensor system 150 is illuminated with modulated illumination light 155 from the illumination device 154, such as a laser. For instance, the light can be infrared (IR) light. Some of the illumination light 155 is reflected by objects in the environment, such as the user's face 160. The reflected light 157 is detected by the imaging sensor 158.

The imaging sensor 158 includes an array (e.g., a two-dimensional (2D) array) of demodulation pixels that generate first image data representative of the reflected light 157. Each demodulation pixel of the imaging sensor 158 is capable of demodulating the received light signal 157. A control unit can be employed to regulate the timing of the imaging sensor 158. The phase values of all pixels of the imaging sensor 158 correspond to distance information R for a corresponding point in the environment, e.g., on the user 170. The distance information from the pixels, in combination with a 2D image of the environment obtained by the imaging sensor 158, can be converted into a 3D image of the environment by one or more image processors, such as the one or more processors 162 of the mobile computing device 152. The image can be displayed to a user, e.g., on a display of a computing device such as the mobile computing device 152, or can be used as a machine vision input.

The distance information R for each pixel can be calculated as:

$$R = \frac{c \cdot ToF}{2},$$

where c is the speed of light and ToF is the time of flight, which is the elapsed time between emission of light 155 from the illumination device 154 and detection of the reflected light 157 by the imaging sensor 158. With each demodulation pixel being capable of demodulating the reflected light concurrently, the imaging sensor 158 can deliver image data sufficient for generation of 3D images in substantially real time, e.g., frame rates of up to 30 Hz or greater than 30 Hz.

In some examples, the modulated illumination light can be pulse intensity modulated light, and the demodulation of the reflected light can deliver the time of flight value directly. In some examples, the modulated illumination light can be continuously intensity modulated light, and the demodulation of the reflected light can deliver the phase delay (P) between the emitted light and the reflected light. The phase delay corresponds to the distance R as follows:

$$R = \frac{P \cdot c}{4\pi f_{mod}},$$

where $f_{mod}$ is the modulation frequency of the illumination light, which can range from, e.g., a few MHz up to several GHz.

In the approaches to presence detection described here, the first image data generated by the array of pixels has a first resolution that is sufficient to generate a high resolution 3D representation (e.g., image) of the environment. However, processing the first image data to generate a 3D representation of the environment can consume a significant amount of power. Processing the lower resolution second image data, data are a less power intensive process. The processing circuitry 180 integrated with the 3D sensor system 150 can generate the second image data, e.g., by compressing the first, higher resolution image data, and can perform the initial lower resolution processing. If the result of that lower resolution processing indicates the presence of an object in the environment, the high resolution first image data can be provided to processors capable of performing the high resolution, power intensive processing involved in generation of a 3D representation of the environment. Otherwise, no high resolution, power intensive processing is performed, thereby saving power.

To implement the initial, low resolution presence detection, the time-of-flight sensor system 150 may embed enough processing power to implement presence detection, e.g., to compress the image data and to perform distance calculations to determine a distance between the sensor and an object in the field of view of the sensor. This embedded processing power can include, for instance, raw data accumulation of subframes or periods of the incident data, distance calculation, amplitude calculation, offset calculation, reference compensation, calibration compensation, saturation or pile-up detection and/or range disambiguation.

Figure 2:
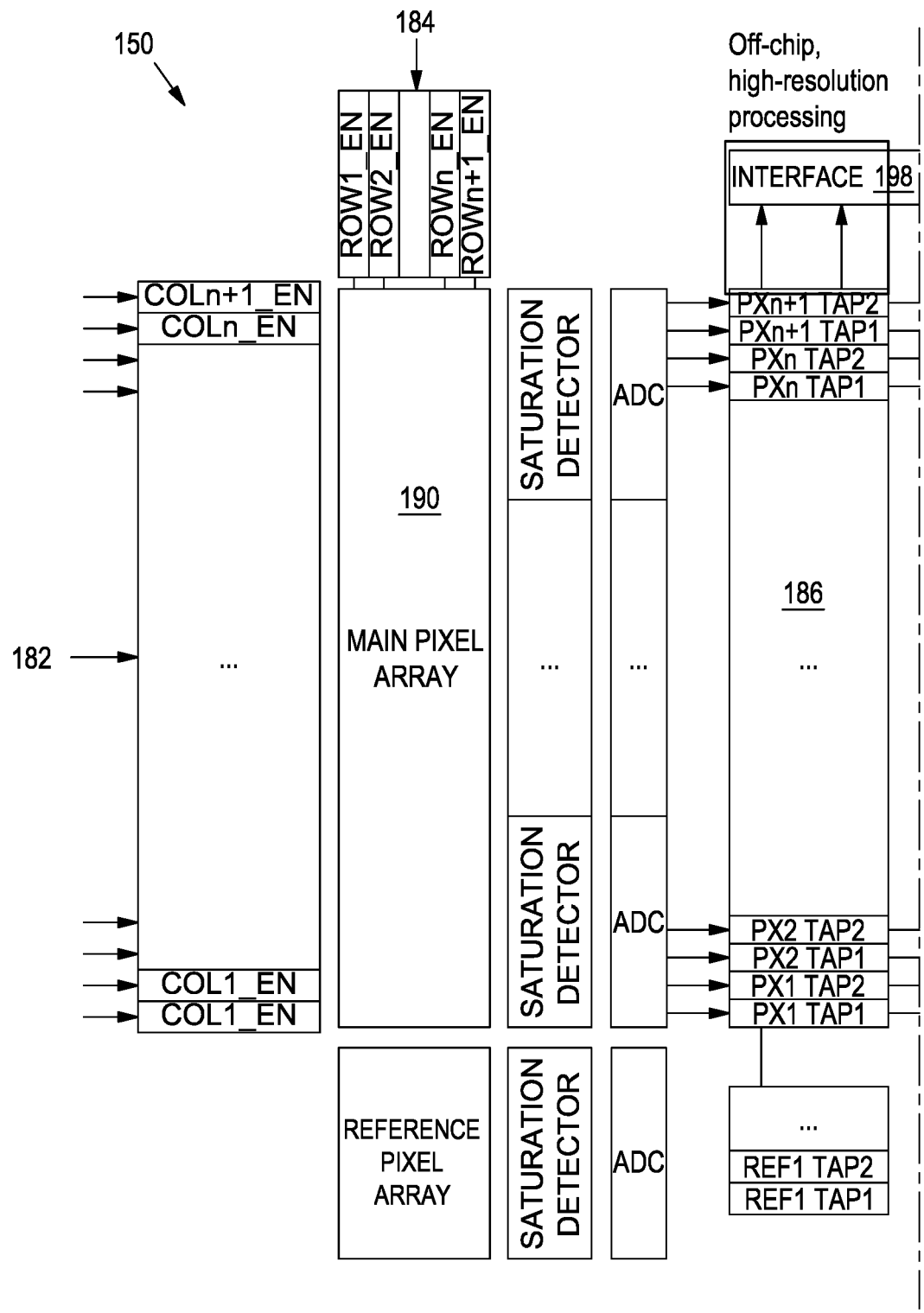
FIG. 2 is a view of processing circuitry of a 3D sensor system.
Figure 2:
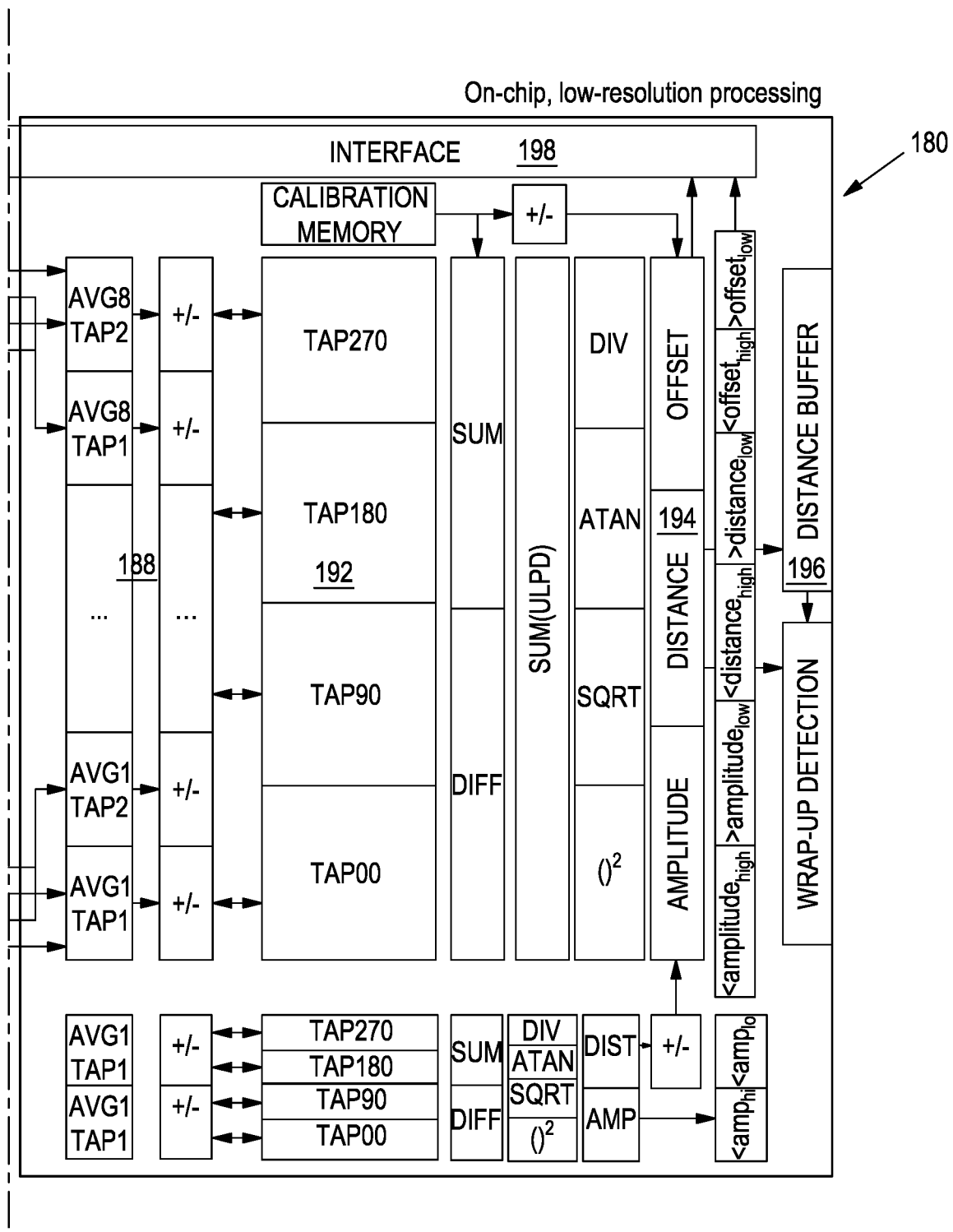

Referring to FIG. 2, in some examples, the processing circuitry 180 of the 3D sensor system 150 (sometimes referred to as low-resolution processing circuitry) is integrated with an array 190 of demodulation pixels of the imaging sensor 158. For instance, the low-resolution processing circuitry 180 and the array 190 of demodulation pixels can be formed as an integrated circuit in a common semiconductor substrate.

As discussed above, the array 190 of demodulation pixels receives and demodulates the light signal reflected from the environment, generating first, high resolution image data. For instance, the first image data can have a resolution of C×R, where C is the number of columns 182 of pixels in the array 190 of pixels and R is the number of rows 184 of pixels in the array 190 of pixels. The first, high resolution image data are provided to a frame memory 186.

From the frame memory 186, the first, high resolution image data are provided to the low-resolution processing circuitry 180 of the 3D sensor system 150. The low-resolution processing circuitry 180 includes compression circuitry 188 that compresses the first, high resolution image into second, lower resolution image data. For instance, the compression element 188 can implement a down sampling process to reduce the resolution of the first image data, thereby generating the second image data, where the second image data include fewer pixels of data than the first image data. In some embodiments, the first image data are compressed into the second image data by grouping pixels into clusters, shown in detail in FIGS. 5A-D. Other approaches to data compression can also be employed.

The second, lower resolution image data are processed by one or more processing elements 192 of the low-resolution processing circuitry 180. The processing elements 192 can be configured to implement image processing techniques, such as image processing techniques for ToF sensor systems. For instance, in some examples, the processing of the second image data can include, for each pixel of data of the second image data, determining, e.g., calculating, a distance between the imaging sensor 158 and an element of the environment represented by that pixel of data. By performing this image processing on the lower resolution image data, the power consumption of the image processing can be significantly lower than performing the same image processing on the high resolution first image data.

Distance threshold circuitry 194 of the low-resolution processing circuitry 180 compares the determined distances for each of the pixels of the second image data to a threshold distance stored in a distance buffer 196. If the determined distance satisfies the threshold distance, the second image data indicates that an object is present in the environment. In some examples, the determined distance satisfies the threshold distance when the determined distance exceeds the threshold distance. In some examples, the determined distance satisfies the threshold distance when the determined distance falls below the threshold distance. In some examples, the threshold distance includes multiple thresholds, such as an upper threshold and a lower threshold, and the determined distance satisfies the threshold distance when the determined distance falls between the upper threshold and the lower threshold.

In some examples, other features of the second image data, such as amplitude, can be used instead of or in addition to the distance as part of the presence detection processing. The processing elements can determine, e.g., calculate, one or more of those other features (e.g., the amplitude), and other threshold circuitry (e.g., amplitude threshold circuitry) can perform a comparison to determine whether one or more of those features of the second image data are indicative of the presence of an object in the environment.

When the low-resolution processing circuitry 180 determines that the second image data indicates that an object is present in the environment, the first, high-resolution image data are provided from the 3D sensor system 150 to one or more processors, such as ASICs, for generation of a high-resolution, three-dimensional image of the environment. For instance, the first image data can be provided to the one or more processors via an interface 198. For instance, the interface 198 can include a high-speed interface (e.g., Mobile Processor Interface Camera Serial Interface (MPI CSI)) for high resolution images or data, and a low-speed interface (e.g., an I2C interface) for low resolution images or data.

In some cases, the 3D system discards data when no object is detected to be positioned in front of the device or the object is out of the optimal operational range, too close or too far, since captures outside the optimal operational range may not be reliable.

Figure 3:
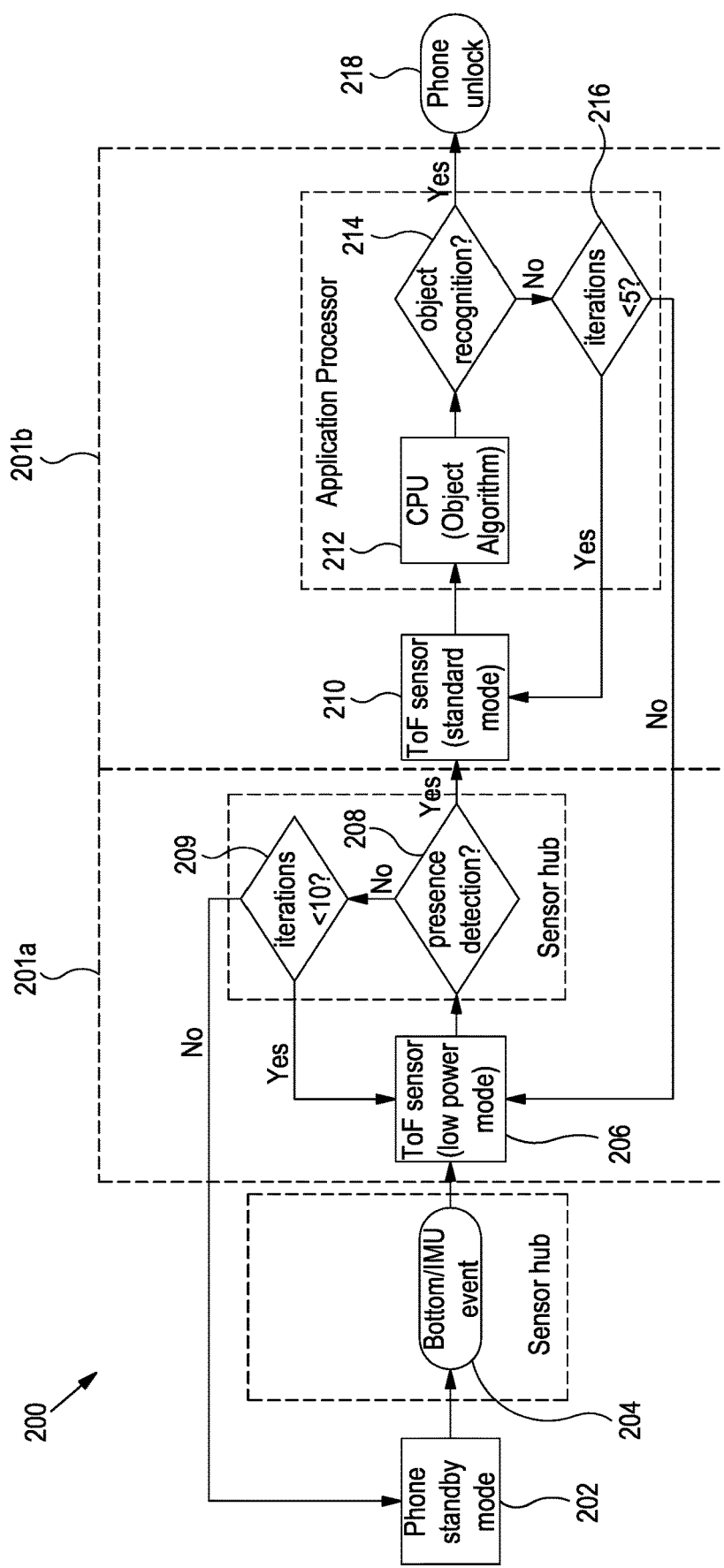
FIG. 3 is a flow chart of a method for presence detection and 3D imaging.

Referring to FIG. 3, in some examples, a 3D sensor system of a mobile computing device performs a method 200. The method 200 is used to reduce power consumption during image processing by initially determining the presence of an object in an environment of the 3D sensor system, on processing circuitry of the sensor system, using low-resolution image data. If the low-resolution image data indicate that an object is present, then high resolution image data are processed, e.g., by one or more processors of the mobile computing device, to generate a 3D image of the environment. Processing of high-resolution image data for generation of 3D images can consume a large amount of power. By having a first, low-resolution presence detection step that consumes significantly less power, the 3D sensor system can be operated in a more power efficient manner. For instance, the 3D sensor system can trigger the power-intensive processing for generation of 3D images only when an object is determined to be present. Although FIG. 3 is described with respect to a mobile computing device, other types of devices incorporating 3D sensor systems can also carry out the method of FIG. 3 or similar methods.

At the start of the method 200, the mobile computing device (e.g., a cell phone, tablet, or other type of mobile computing device) is in standby mode 202, for example temporarily locked or asleep. In the example of FIG. 2, an event occurs 204 in which a user indicates that he/she desires an unlocked mobile computing device. For example, the user may shake the mobile computing device or press a button on the mobile computing device. In some examples, the method can proceed without the occurrence of such an event.

In response to the occurrence of the event 204, the 3D sensor system of the mobile computing device is active in a low power presence detection mode 206. In the low power presence detection mode 206, the 3D sensor system of the mobile computing device illuminates the environment of the mobile computing device, and a time of flight (ToF) sensor of the 3D sensor system detects light reflected from the environment. First, high resolution image data are generated based on the reflected light. Second, lower resolution image data are generated based on the first image data, e.g., by reducing the resolution of the first image data. The second, lower resolution image data are processed in the low power presence detection mode 206 by processing circuitry of the 3D sensor system to determine whether the lower resolution image data are indicative of the presence of an object in the environment (208).

In some systems, the determination of whether the second image data are indicative of the presence of an object in the environment is based on whether the distance between an object indicated by the data and the sensor satisfies a threshold. For example, the system may determine that an object is present if the second data indicate the presence of an object (e.g., a user's face) at a distance of between 0.3 m and 1 m from the sensor.

In some examples, if the second image data do not indicate the presence of an object, the low-power presence detection mode repeats the presence detection process 206 for one or more additional iterations 209. In the example of FIG. 3, the low-power presence detection mode repeats the presence detection process 206 for 10 iterations 209. On the last (e.g., tenth) iteration, if no object has been detected in the environment, the mobile device returns to standby mode 202. In some examples, if the second image data do not indicate the presence of an object after only a single iteration, the presence detection process ends and the mobile device returns to standby mode 202.

If the presence detection process 208 determines that the second image data indicate that an object is present in the environment, a standard mode 210 is active. Standard mode 210 encompasses the processing of the first, high resolution image data for generation of 3D representations (e.g., images) of the environment, and generally consumes significantly more power than does the low-power presence detection mode.

In standard mode 210, the first, high-resolution image data are sent to one or more processors, such as processors of the mobile computing device, e.g., ASICs. The one or more processors perform an image data processing algorithm 212 to generate a 3D representation, e.g., image, of the environment based on the first, high-resolution image data.

In the example of FIG. 2, the image data processing algorithm encompasses a recognition algorithm in which the image data are processed to determine whether an object present in the environment is a recognized object 214. For instance, a recognition algorithm can attempt to recognize an object present in the environment as the face of a user to enable unlocking of the mobile device.

In some examples, if no object in the environment is recognized, the recognition algorithm is repeated for one or more additional iterations 216. In the example of FIG. 3, the recognition algorithm is repeated for 5 iterations 216. On the last (e.g., fifth) iteration, if no object in the environment has been recognized, the low-power presence detection mode 206 is resumed (as shown) or the mobile device is returned to standby mode 202. In some examples, the recognition algorithm proceeds for only a single iteration, and if the recognition algorithm is unable to determine that any object present in the environment is a recognized object, the standard mode image processing ends and the low-power presence detection mode 206 is resumed or the mobile device is returned to standby mode 202.

If the recognition algorithm is able to determine that an object is present in the environment is a recognized object, the mobile device is unlocked 218.

In some embodiments, the method 200 can include estimating a signal to noise ratio of the second image data based on an intensity of the second image data, and regulating an exposure time of the array of pixels to the reflected light based on the estimated signal to noise ratio. The estimation of the signal to noise ratio allows for the adjustment of the exposure time, the illumination power, or both based on the estimated signal to noise ratio.

In some embodiments, the method can include regulating a power of the illumination device based on an intensity of the second image data.

Figure 4:
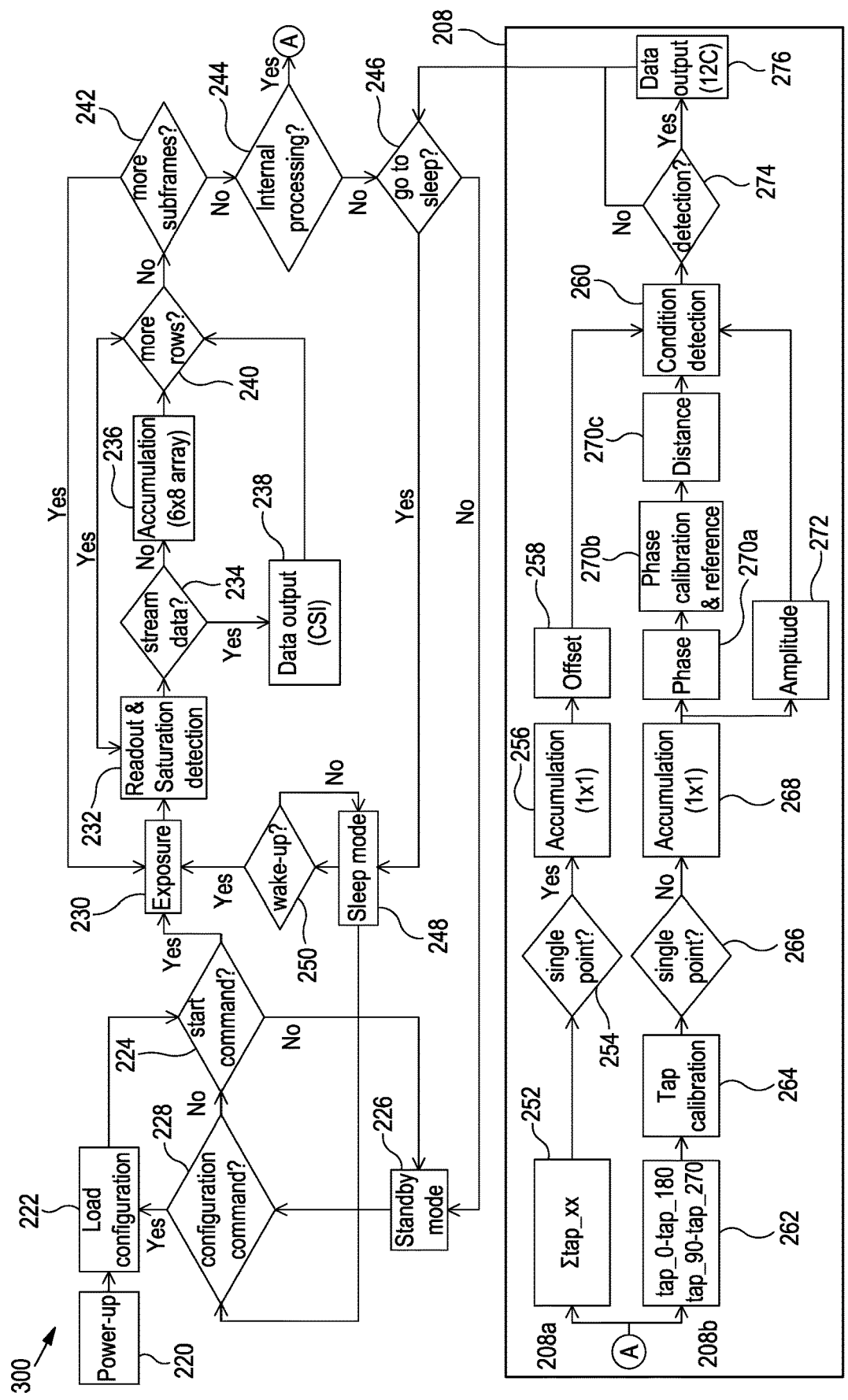
FIG. 4 is a flow chart of a method for presence detection.

FIG. 4 shows a method 300 including steps that occur before and during the low power presence detection mode. In some embodiments, the steps in the method 300 can also be used or added to the steps in method 200 before and during low power presence detection. The steps shown in FIG. 4 can be performed using a 3D sensing system.

The system first powers up 220 from a standby mode and loads a configuration 222. A start command 224 is then prompted that if rejected, returns the system to standby mode 226. After step 226 is confirmed, a configuration command 228 is prompted. If accepted the system returns to loading a configuration 222. If rejected the system returns to the start command prompt 224. When the system accepts the start command prompt 224, the 3D sensor system begins with an exposure step 230 followed by readout and saturation detection 232. The system then prompts whether to stream the data 234. If streaming data is executed, the data are output 236. If streaming data is not indicated, the data accumulate in an array, such as a 6×8 array 238. The system determines whether to add additional rows 240. If more rows are added, the method repeats readout and saturation detection 232 to add additional data. If more rows are not indicated at step 240, the system then determines if more subframes 242 are indicated. If more subframes are indicated, the method returns to step 230 and provides more readout and saturation detection 232. If no additional subframes are added, the system prompts for internal processing 244. If the system opts for no internal processing 244, the system prompts whether to return to sleep mode 246. If the system returns to sleep 248, it awakens 250 and returns to the exposure step 230. If the system does not go to sleep, the system enters standby mode 226, which returns the method to step 228. If the system opts for internal processing, the system executes presence detection.

Presence detection includes multiple steps, shown within the box 208. These steps are all performed by processing circuitry of the 3D sensor system. There are two pathways for proceeding with presence detection. A single point detection 208a begins by summing the tap_XX characters 252. Single point detection is confirmed 254, the data accumulate in a 1×1 pixel or 1×1 pixel cluster 256, and the data are offset 258 to provide a condition for detection 260. Multipoint detection 208b begins by subtracting tap_0 from tap_180 and tap_90 from tap_270 262. The system calibrates the tap 264 and confirms multipoint detection 266. The data accumulate in a 1×1 pixel or 1×1 cluster of pixels 268. The phase is measured 280a, calibrated, and referenced 280b, and distance is measured 280c to generate data for condition detection 260. Alternatively, the system can measure the amplitude 272 of the multipoint data for condition detection 260, or can measure another feature of the data. Finally, the presence of an object in the environment is detected 274. When the presence of an object is detected, data output 276 to one or more processors for further processing, e.g., for processing of higher resolution data used in generation of 3D representations (e.g., images) of the environment. Alternatively, if no object is detected in the environment, the system returns to sleep mode 246 and may repeat the method 200 when prompted by a user.

FIGS. 5A-5D show examples of approaches to reducing the resolution of the first, high resolution image data to generate lower resolution second data for low power presence detection processing.

Figure 5A:
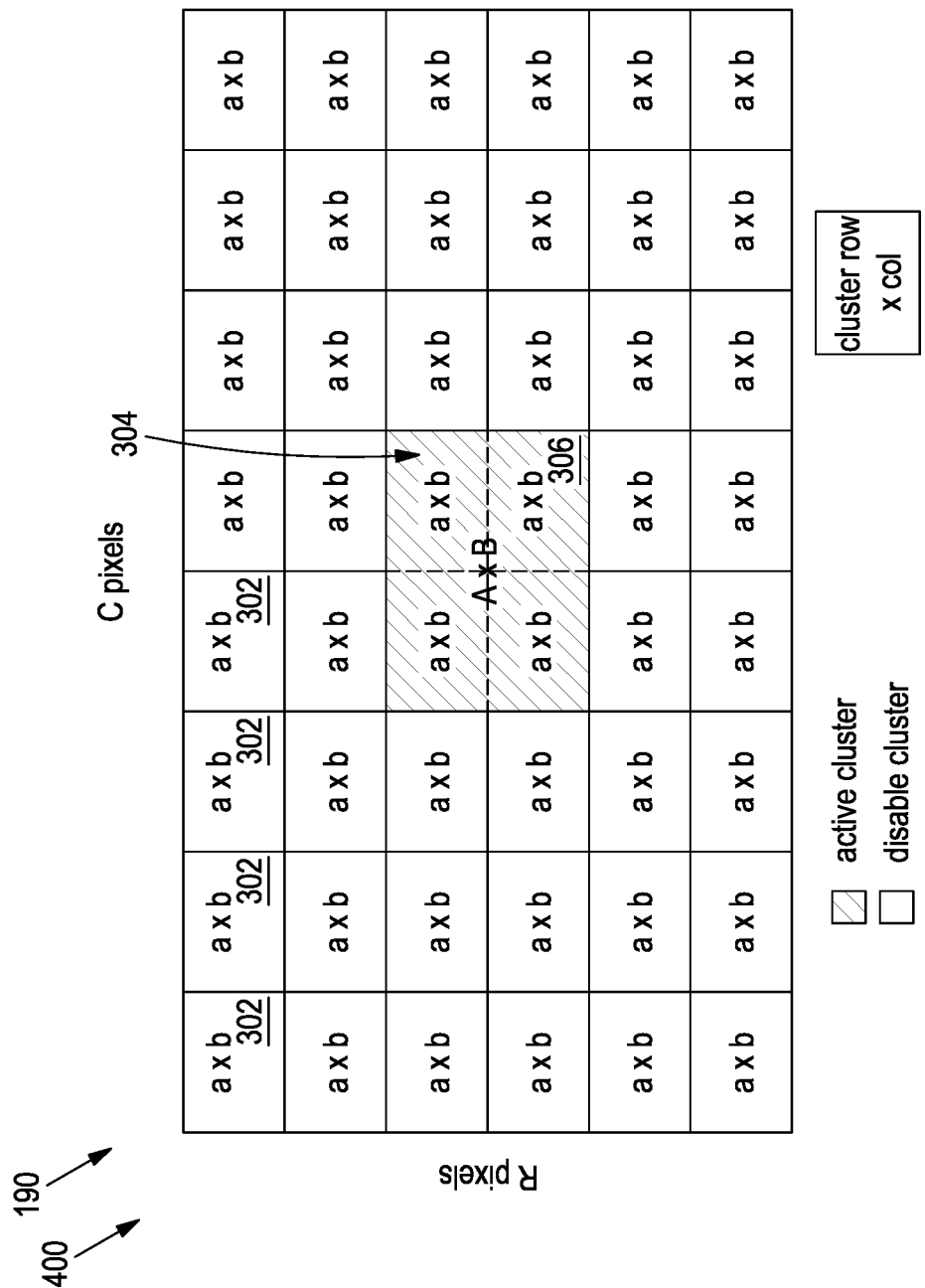
FIG. 5A shows an approach to reduction of image data resolution for single-point detection in a 3D sensor system.

FIG. 5A shows an approach to reducing the resolution of image data by generating a compressed pixel map 400 for performing low-resolution, single point detection. The first image data from the sensor (e.g., the TOF imaging sensor 158 of FIG. 1) has a resolution of C×R pixels. The resolution of the first image data may be reduced by grouping pixels of the first image data into each of multiple pixel clusters 302, each pixel cluster containing a×b pixels, where a is the number of rows of pixels in the cluster and b is the number of columns of pixels in the cluster. Multiple pixel clusters 302 may be further grouped into a superpixel 304. Detection of the presence of an object can be performed by a single point detection approach using the pixel clusters or superpixel generated in this manner.

Single point detection is the detection of the presence of an object based on image data from only a single pixel, pixel cluster 302, or superpixel 304. The pixel, pixel cluster, or superpixel used in single point detection is referred to as an active pixel, pixel cluster, or superpixel; pixels not used in single point detection are referred to as disabled pixels. Active pixels and disabled pixels both detect light reflected from the environment. However, the data from disabled pixels are not used in presence detection, while the data from active pixels are used in presence detection. In this example, the superpixel A×B 304 is active, meaning that the clusters 302 in the superpixel 304 are active make up an active area 306 of the pixel map 400. All other clusters 302 are disabled.

To generate the second, low resolution image data according to the compressed pixel map approach of FIG. 5A, the data of the pixels in each cluster 302 are averaged to generate an average value for the cluster, referred to as ab data. That ab data are averaged across all clusters 302 in the active area, e.g., in a single step averaging or in multiple steps, to generate an overall average value for the pixel map, referred to as AB data. The AB data are used for single point presence detection, meaning that the presence of an object is detected based solely on the AB data, and not based on data from any pixel or cluster that is not included in the AB data. For instance, the AB data can be evaluated with respect to a distance threshold, for example, to determine whether the AB data indicate that there is an object present in the environment that satisfies the distance threshold, e.g., an object at a distance of between 0.3 m and 1 m from the sensor.

In some examples, ultra-low-power operation can be achieved by increasing the number of pixels clustered into the superpixel 304 and reducing the optical power accordingly. For instance, pixels not included in the superpixel can be disabled. In some examples, illumination corresponding to the disabled pixels can also be disabled for further power conservation, e.g., corresponding to the use of segmented illumination or the use of multiple illuminators. For instance, one illuminator can be operated with a full field of illumination can be operated, and a second illuminator can be operated with a field of illumination corresponding to the extent of the superpixel.

Figure 5B:
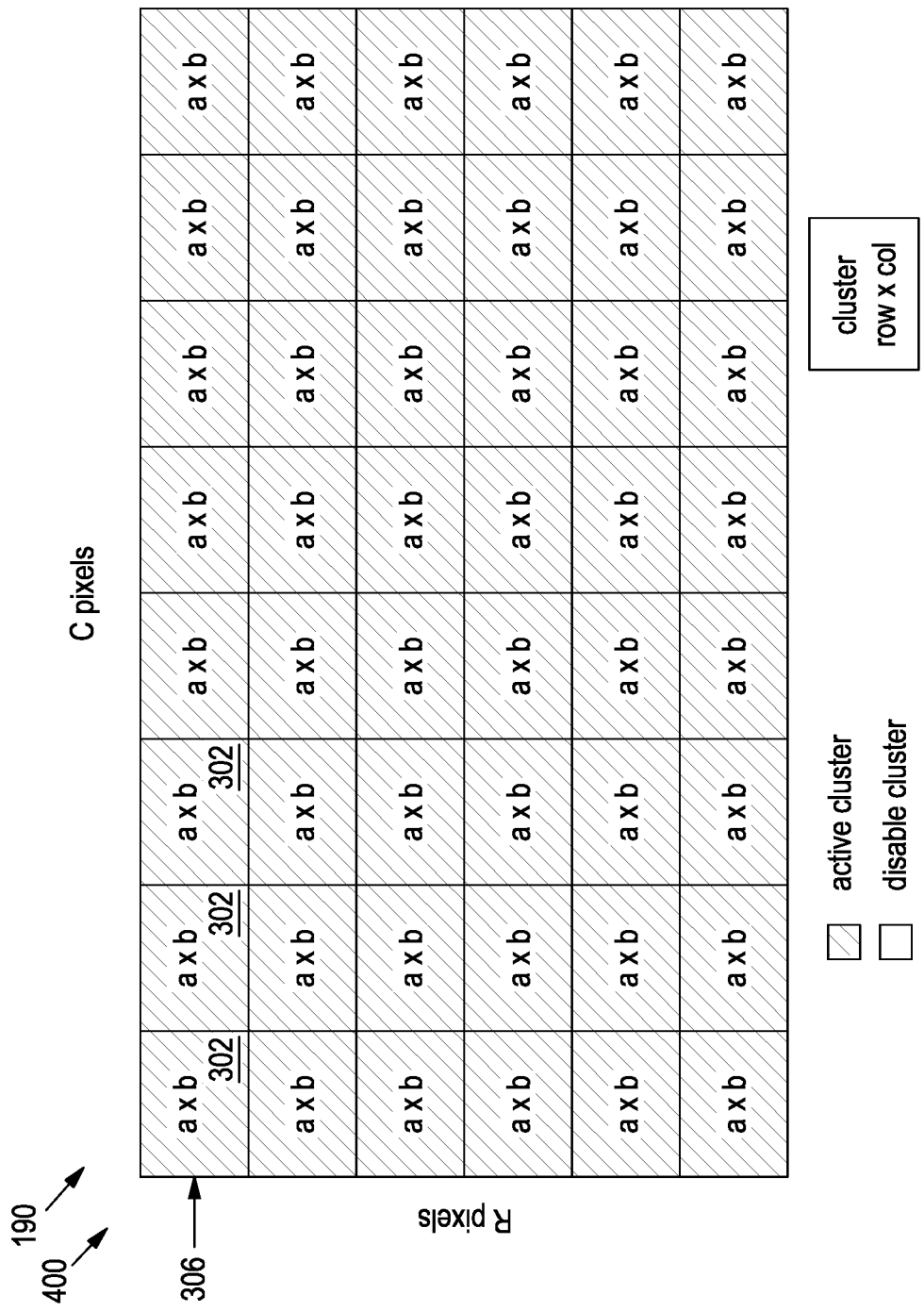
FIGS. 5B and 5C show approaches to reduction of image data resolution for uniform multi-point detection in a 3D sensor system.
Figure 5C:
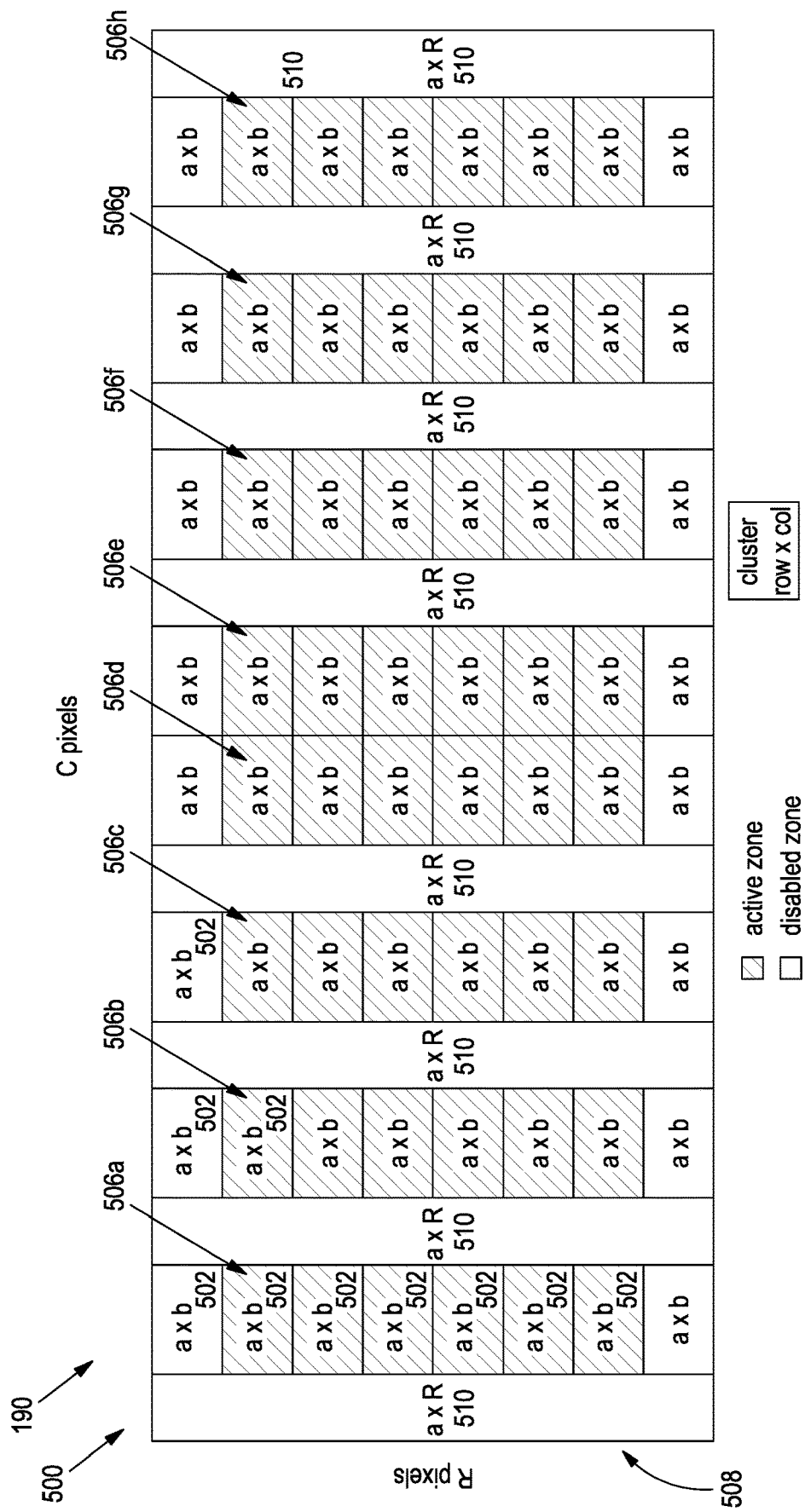
Figure 5D:
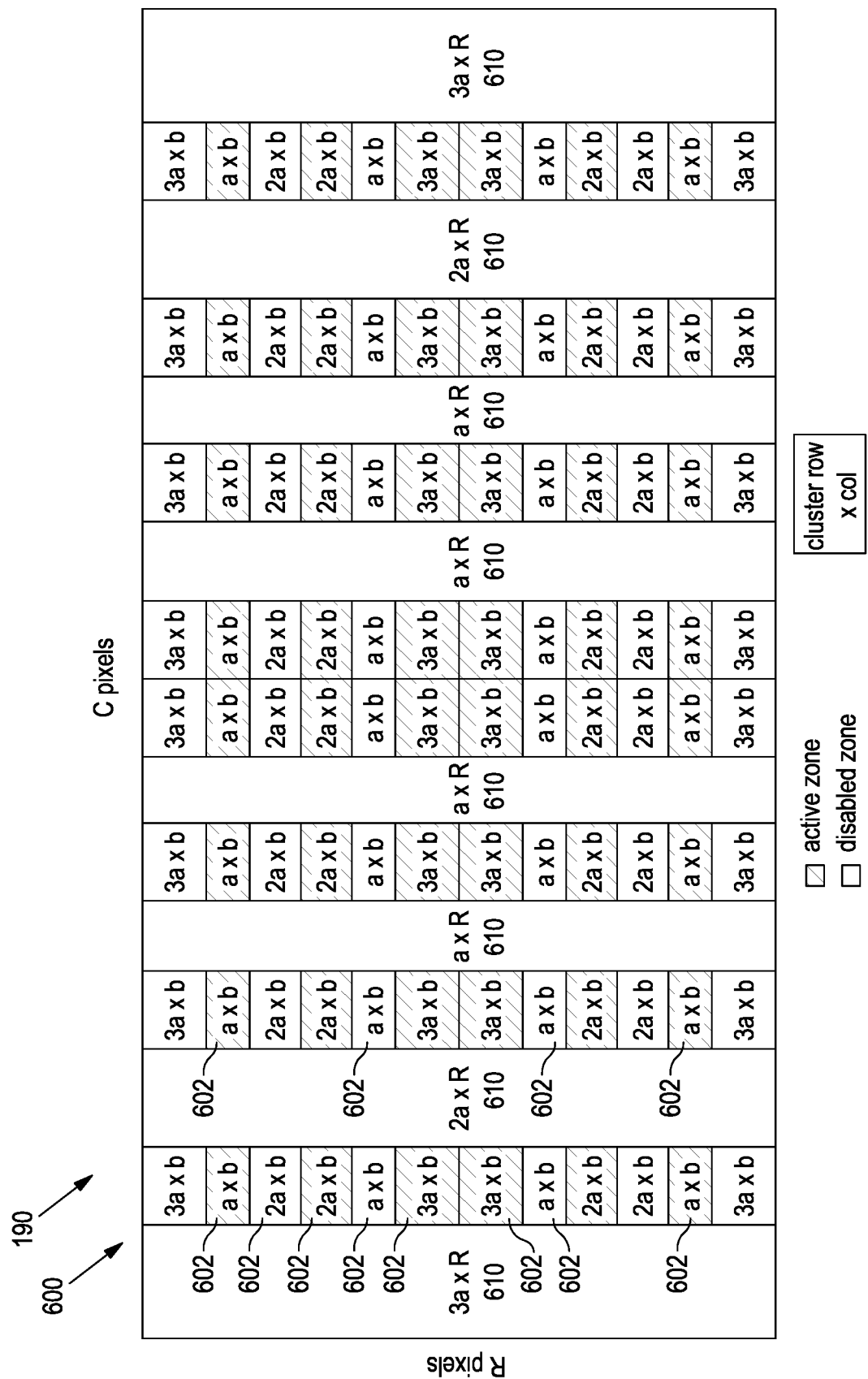
FIG. 5D shows an approach to reduction of image data resolution for non-uniform multi-point in a 3D sensor system.

FIGS. 5B, 5C, and 5D show approaches to reducing the resolution of image data by generating compressed pixel maps 400, 500, 600, respectively, for performing low resolution, multipoint detection. Multipoint detection is the detection of the presence of an object based on image data from any one or more of multiple clusters of pixels. Multipoint detection can include uniform multipoint detection (shown in FIGS. 5B and 5C) or non-uniform multipoint detection (shown in FIG. 5D).

In FIG. 5B, the pixel map 400 is used for uniform multipoint detection, which is multipoint detection based on image data from any one or more of multiple, identically sized clusters of pixels. In the example of FIG. 5B, the pixels in the active area 406 are grouped into identically sized clusters 402, with each cluster containing a×b pixels. In FIG. 5B, all the clusters 402 are active, meaning that the entire map 400 makes up the active area 406 that is used for presence detection. To generate the second, low resolution image data according to the pixel map 400 of FIG. 5B, the data of the pixels in each cluster 402 are averaged to generate an average value for the cluster, referred to as ab data. An object is determined to be present in the environment if the ab data for any one or more of the clusters 402 indicate the presence of an object, e.g., if the ab data for any one or more of the clusters satisfy distance threshold.

In some examples, the uniform multipoint detection approach implemented by the map 400 can be useful for detection not only of the presence of an object, but for the detection of the position of the object (e.g., in a corner or side of the field of view of the sensor).

In some examples, lower power operation can be achieved by increasing the number of pixels per cluster and reducing the optical power accordingly. In some examples, more complex detecting filtering can be achieved by increasing the number of clusters (e.g., with each cluster having fewer pixels), e.g., as a trade off against power consumption.

In FIG. 5C, the pixel map 500 is used for uniform multipoint detection, with fewer than all of the pixels being active in the presence detection process. The low resolution, second image data is generated based on the higher resolution first image data by both grouping of pixels into clusters and by down sampling of the first image data. In particular, some of the pixels are grouped into identically sized clusters 502, with each cluster 502 containing a×b pixels. Only some of the clusters 502 are active, indicated as active areas 506a-h. The active areas 506a-h are arranged in columns.

Other pixels that are not grouped into the clusters 502 are grouped as columns 510 containing a×R pixels. The columns 510 can be disabled, e.g., not part of the active areas and thus not used for presence detection. The architecture of a pixel map is typically sorted into columns, with the power consumed depending on the number of active columns of pixels. By disabling some of the columns of pixels in the pixel map 500, further power conservation can be achieved.

In some examples, some of the clusters 502 of pixels are not active areas. For instance, the disabled clusters can be located around the edge of the pixel map 500. Because users typically place objects of interest near the center of the sensor rather than the edges, disabling the clusters near the edges can further conserve power without significantly impacting the outcome of the presence detection process.

To generate the second, low-resolution image data according to the compressed pixel map approach of FIG. 5C, the data of the pixels in the clusters 502 that make up the active area 506a-h are averaged to generate an average value for each cluster, referred to as ab data. An object is determined to be present in the environment if the ab data for any one or more of the clusters 502 in the active areas 506a-h indicate the presence of an object, e.g., if the ab data for any one or more of the clusters in the active area satisfy a distance threshold data.

In FIG. 5D, the pixel map 600 is used for non-uniform multipoint detection, which is multipoint detection based on image data from any of multiple pixel clusters, at least some of which have different sizes. In the example of FIG. 5D, the pixels are grouped into clusters, with some pixels being grouped into clusters containing a×b pixels, other clusters containing 2a×b pixels, and still other clusters containing 3a×b pixels. Other configurations of cluster grouping are also possible. The grouping of pixels into non-uniformly sized clusters can increases light collection in certain areas of the image sensor, e.g., to enhance the resolution or accuracy of the presence detection in those areas. Only some of the clusters 602 are active, indicated as active areas 606. In the example of FIG. 5D, the clusters 602 in the active areas 606 increase in size the closer the cluster 602 is to the center of the map 600, which contributes to more accurate presence detection in the center of the sensor, where an object of interest is more likely to be located. In some examples, some of the clusters 602 of pixels are not active areas, e.g., for further power conservation. For instance, larger clusters 602 located around the edge of the pixel map 600 can be disabled for power conservation because users typically place objects of interest near the center of the sensor rather than the edges.

Other pixels that are not grouped into the clusters 602 are grouped as columns 610, e.g., columns of varying size, e.g., columns containing a×R, 2a×R, or 3a×R pixels. The columns 610 can be disabled to achieve further power conservation.

To generate the second, low-resolution image data according to the compressed pixel map approach of FIG. 5D, the data of the pixels in the clusters 602 that make up the active areas 506 are averaged to generate an average value for each cluster, referred to as ab data. Because the clusters are non-uniformly sized, the amount of data averaged to generate the ab data varies by cluster. An object is determined to be present in the environment if the ab data for any one or more of the clusters 602 in the active areas 606 indicate the presence of an object, e.g., if the ab data for any one or more of the clusters 602 in the active area satisfy a distance threshold.

In some embodiments, the approaches described here, such as the approaches of FIGS. 5B-5D, can include identifying a region in which the object is positioned based on which cluster or clusters of pixels correspond to data indicating that an object is present in the environment. The processing circuitry of the time-of-flight sensor can provide information indicative of the identified region to the one or more processors that perform the 3D image generation, which can then process the first image data only near the identified region, thus reducing the power used even when generating a 3D representation of the object.

While presence detection using a distance threshold has been described, some embodiments may use a different threshold, such as an amplitude threshold or another type of threshold. For example, in some embodiments, the low-resolution image data arecan filtered by multiple conditions to perform presence detection. In some embodiments, the low-resolution image data can be filtered using spatial pattern information to perform presence detection.

In some embodiments, the 3D sensing system has multiple low-power modes each implementing a different, e.g., successive, approach to presence detection, for example, a first single point detection approach followed by detection of simple shapes, and finally presence detection or object recognition based on a 3D representation of the environment.

In some examples, the power consumption of time-of-flight systems can depend on performance such as spatial resolution or distance accuracy. Time-of-flight sensors can scale spatial resolution by pixel binning and decrease power consumption by smartly disabling power hungry block such as toggle gate drivers. Moreover, time-of-flight sensors can adapt the illumination schema to decrease power consumption to achieve a give distance accuracy on any a given distance range.

Figure 6:
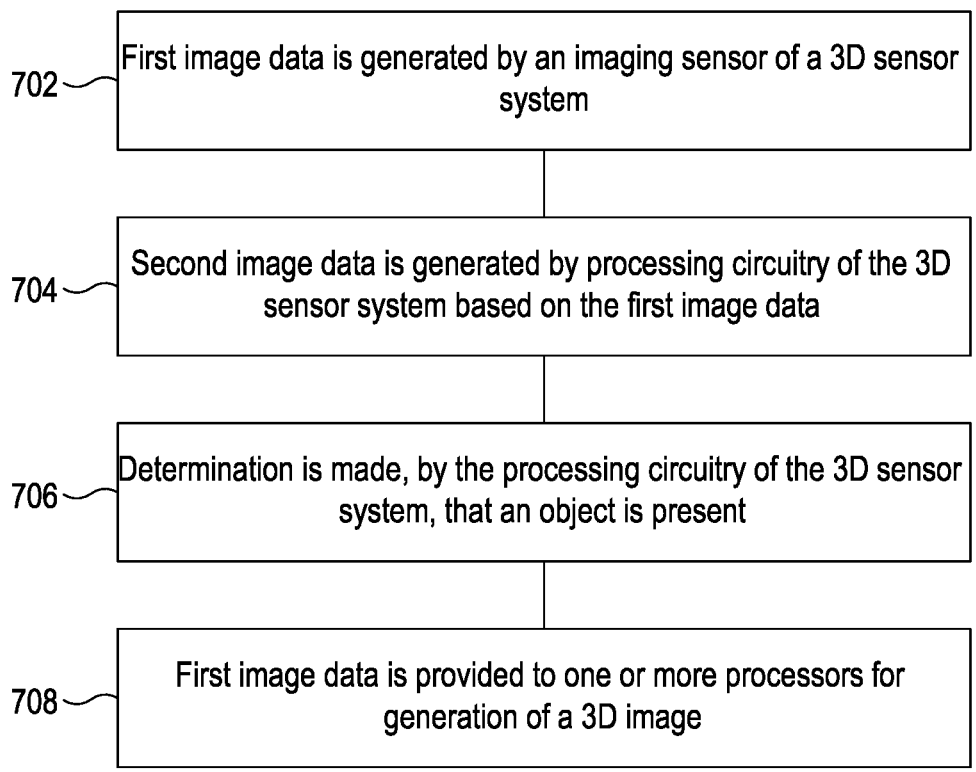
FIG. 6 is a flow chart.

FIG. 6 is a flow chart for a method to detect the presence of an object in an environment using a 3D sensor system, such as a time-of-flight sensor system. First image data representative of reflected light from an environment is generated by an array of pixels of an imaging sensor of the 3D sensor system (702). The image data has a first resolution.

Second image data is generated by processing circuitry of the 3D sensor system based on the first image data (704), e.g., by compressing or down sampling the first image data. The second image data has a second resolution less than the first resolution. For instance, the processing circuitry of the 3D sensor system can be integrated with circuitry of the sensing system, e.g., formed in the same integrated circuit chip.

A determination is made, by the processing circuitry of the 3D sensor system, that the second image data indicates that an object is present in the environment (706). For instance, a distance between the 3D sensor system and an object can be determined and compared to a threshold. In some examples, then the distance does not satisfy the threshold, no further processing is carried out, e.g., a mobile computing device housing the 3D sensor system is entered into a sleep mode.

Responsive to the determining, the first image data is provided from the time-of-flight sensor system to one or more processors configured to generate a three-dimensional image of the environment based on the first image data (708). For instance, the one or more processors can be ASICs of a mobile computing device housing the 3D sensor system.

Figure 7:
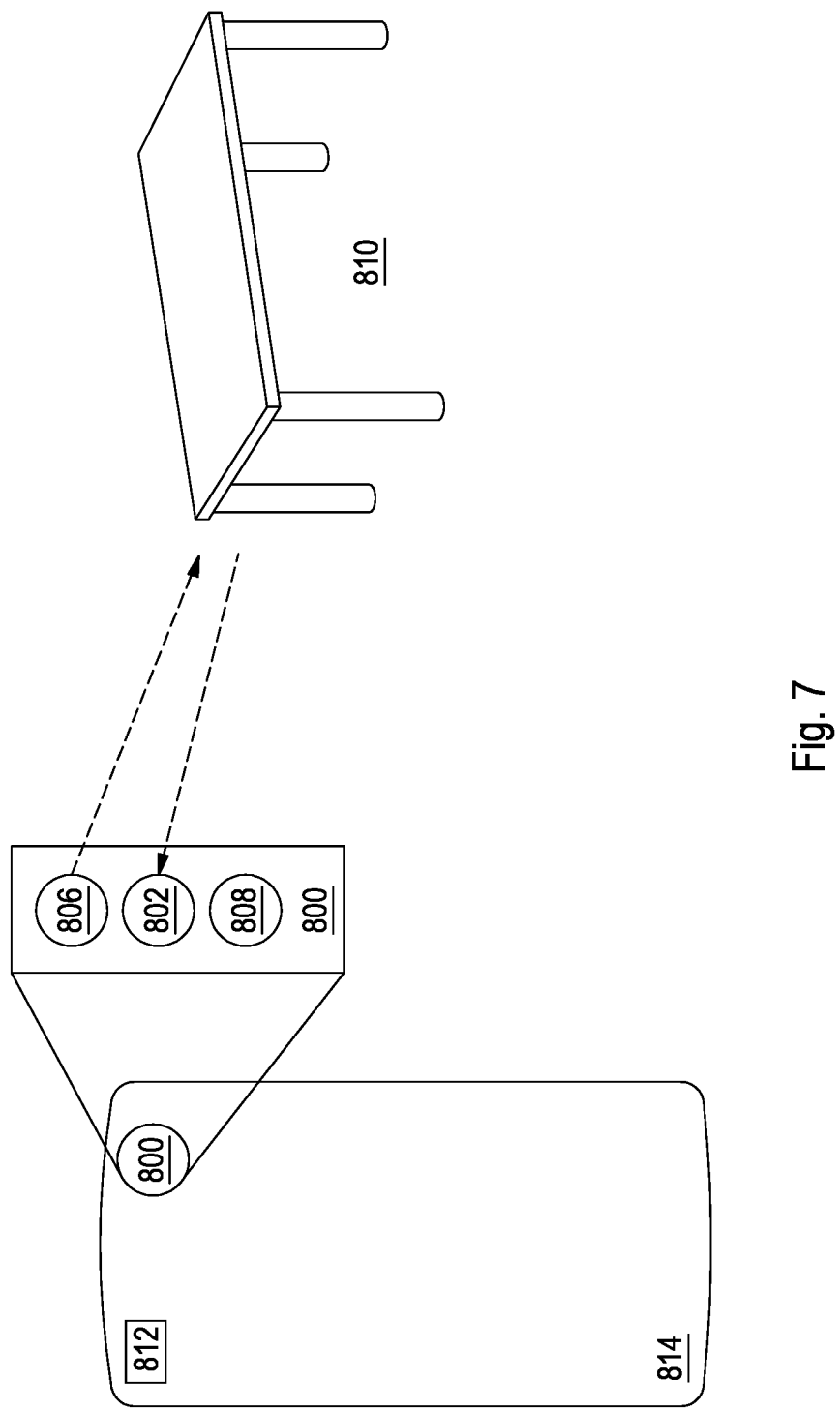
FIG. 7 is a view of a 3D sensor system.

Referring to FIG. 7, in some examples, a 3D sensor system 800 employing ToF sensors 802 such as those described here can be mounted on a back side of a mobile computing device 804. The back side is the side of the device opposite the front side, such as the side that does not include a screen. The 3D sensor system 800 can be a back-side sensor system that includes an illumination device 806, imaging components including a ToF imaging sensor 802, and processing circuitry 808 for low resolution presence detection. The back-side 3D sensor system 800 can be used, e.g., for object recognition or for environmental mapping, such as mapping of a room 810, e.g., by one or more processors 812.

Figure 8:
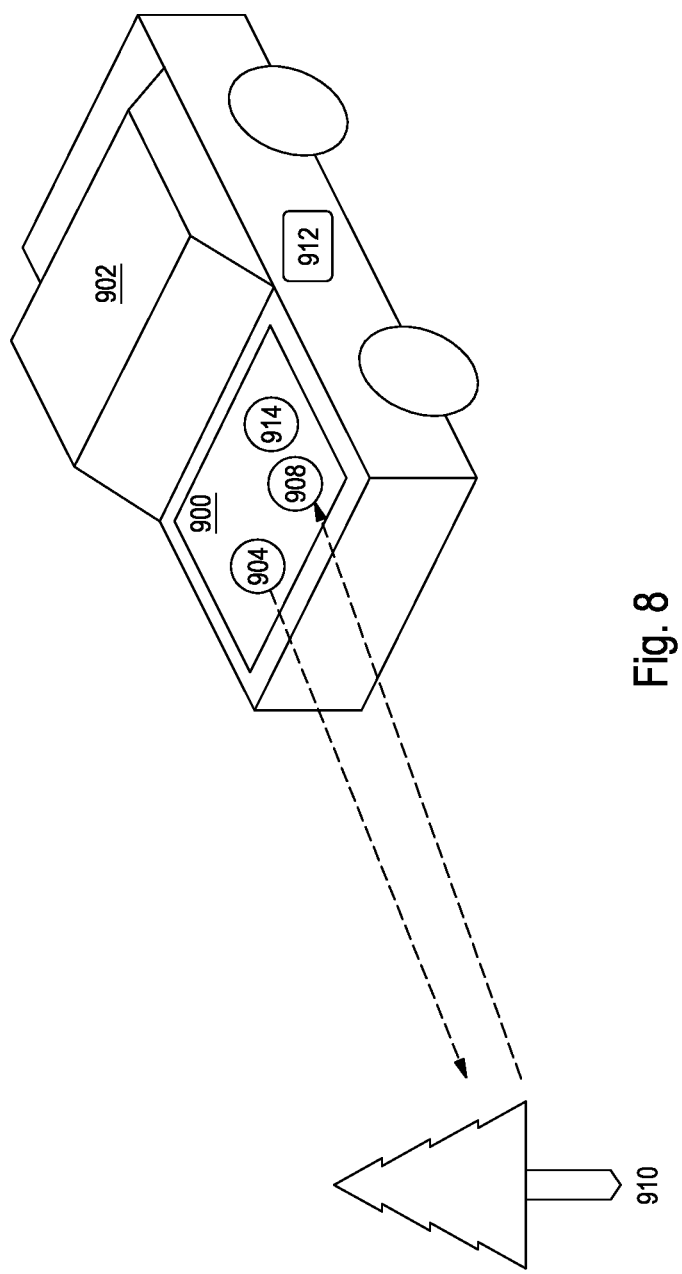
FIG. 8 is a view of a 3D sensor system integrated with an automobile.

Referring to FIG. 8, in some examples, a 3D sensor system 900 employing ToF imaging sensors such as those described here can be incorporated into a vehicle 902, such as a partially-autonomous or fully-autonomous vehicle. The vehicle can be a land-based vehicle (as shown), such as a car or truck; an aerial vehicle, such as an unmanned aerial vehicle; or a water-based vehicle, such as a ship or submarine. The 3D sensor system 900 includes an illumination device 904, imaging components including a ToF imaging sensor 908, and processing circuitry 914 for low resolution presence detection. The 3D sensor system 900 can be used, e.g., for 3D mapping of the environment of the vehicle 902. For instance, the 3D sensor system 900 can be used to generate a 3D image of an object 910, e.g., an object in or near a roadway on which the vehicle 902. By determining the 3D shapes of various objects, a mapping of an environment of the vehicle can be determined and used to control the partially- or fully-autonomous operation of the vehicle 902, e.g., by a computing device 912 including one or more processors.

3D sensor systems employing ToF sensors such as those described here can be incorporated into other devices, including game consoles, distance measuring devices, surveillance devices, and other devices.

A number of embodiments of the invention have been described. Nevertheless, it will be understood that various modifications may be made without departing from the spirit and scope of the invention. Accordingly, other embodiments are within the scope of the following claims.

What is claimed is:

1. A method for operating a 3D sensor system, the method comprising:
   by an array of pixels of an imaging sensor of the 3D sensor system, generating first image data representative of reflected light from an environment, the image data having a first resolution;
   by processing circuitry of the 3D sensor system, generating second image data based on the first image data, the second image data having a second resolution less than the first resolution;
   by the processing circuitry of the imaging sensor, determining that the second image data indicates that an object is present in the environment; and
   responsive to the determining, providing the first image data from the 3D sensor system to one or more processors configured to generate a three-dimensional image of the environment based on the first image data.

2. The method of claim 1, wherein the determining by the processing circuitry of the imaging sensor uses less power than the generation of the three-dimensional image by the one or more processors.

3. The method of claim 1, wherein determining that the second image data indicates that the object is present in the environment comprises determining a distance from the 3D sensor system to the object and comparing the distance to a threshold.

4. The method of claim 3, further comprising when the distance does not satisfy the threshold, causing a mobile device housing the 3D sensor system to enter a sleep mode.

5. The method of claim 1, wherein generating second image data based on the first image data comprises down sampling the first image data.

6. The method of claim 1, wherein generating the second image data comprises:
   grouping pixels in the array of pixels into at least one cluster of pixels; and
   generating cluster data for each of the at least one cluster of pixels, and wherein the second image data comprises the cluster data.

7. The method of claim 6, wherein determining that the second image data indicates that an object is present in the environment comprises performing single point detection using the cluster data from a single one of the clusters of pixels.

8. The method of claim 6, wherein determining that the second image data indicates that an object is present in the environment comprises performing multipoint detection using the cluster data from multiple clusters of pixels.

9. The method of claim 8, wherein performing multipoint detection comprises performing non-uniform multipoint detection.

10. The method of claim 1, the method further comprising:
    estimating a signal to noise ratio of the second image data based on an intensity of the second image data; and
    regulating an exposure time of the array of pixels to the reflected light based on the estimated signal to noise ratio.

11. The method of claim 1, further comprising regulating a power of an illumination device configured to illuminate the environment based on an intensity of the second image data.

12. The method of claim 1, wherein determining that the second image data indicates that an object is present in the environment comprises identifying a region in which the object is positioned; and comprising providing information indicative of the identified region to the one or more processors.

13. A 3D sensor system comprising:
    an integrated circuit comprising:
       an imaging sensor comprising an array of pixels formed in a semiconductor substrate, the array of pixels configured to generate first image data representative of reflected light from an environment, the first image data having a first resolution;
       processing circuitry formed in the semiconductor substrate, the processing circuitry configured to:
          generate second image data based on the first image data, the second image data having a second resolution less than the first resolution; and
          determine that the second image data indicates that an object is present in the environment; and
       output circuitry configured to provide, responsive to the determining by the processing circuitry, the first image data from the 3D sensor system to one or more processors configured to generate a three-dimensional image of the environment based on the first image data.

14. The system of claim 13, wherein the determining by the processing circuitry uses less power than the production of the three-dimensional image by the one or more processors.

15. The system of claim 13, wherein the processing circuitry is configured to determine a distance from the 3D sensor system to the object and compare the distance to a threshold, based on the second image data.

16. The system of claim 13, wherein the processing circuitry is configured to cause a mobile computing device housing the 3D sensor system to enter a sleep mode when the distance does not satisfy the threshold.

17. The system of claim 13, wherein the processing circuitry is configured to down sample the first image data to generate the second image data.

18. The system of claim 13, wherein the processing circuitry is configured to:
   group pixels in the array of pixels into at least one cluster of pixels, wherein each of the clusters comprises at least one pixel; and
   generate cluster data for each of the at least one cluster of pixels, wherein the second image data comprises the cluster data.

* * * * *